United States Patent
Lee et al.

(10) Patent No.: US 9,838,090 B2
(45) Date of Patent: Dec. 5, 2017

(54) COMMUNICATION METHOD USING INTERFERENCE ALIGNMENT IN WIRELESS LAN

(71) Applicant: ELECTRONICS AND TELECOMMUNICATIONS RESEARCH INSTITUTE, Daejeon (KR)

(72) Inventors: Jae Seung Lee, Daejeon (KR); Jin Hyung Oh, Daejeon (KR); Gwang Zeen Ko, Daejeon (KR); Hyun Duk Kang, Daejeon (KR); Hyoung Jin Kwon, Daejeon (KR); Myung Sun Song, Daejeon (KR); Sok Kyu Lee, Daejeon (KR); Min Ho Cheong, Daejeon (KR); Jae Ick Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/916,920

(22) PCT Filed: Sep. 5, 2014

(86) PCT No.: PCT/KR2014/008360
§ 371 (c)(1),
(2) Date: Mar. 4, 2016

(87) PCT Pub. No.: WO2015/034304
PCT Pub. Date: Mar. 12, 2015

(65) Prior Publication Data
US 2016/0197655 A1    Jul. 7, 2016

(30) Foreign Application Priority Data

Sep. 6, 2013  (KR) .................. 10-2013-0107587
Sep. 3, 2014  (KR) .................. 10-2014-0117232

(51) Int. Cl.
*H04B 7/06*    (2006.01)
*H04B 7/024*   (2017.01)
(Continued)

(52) U.S. Cl.
CPC ........... *H04B 7/024* (2013.01); *H04B 7/0452* (2013.01); *H04B 7/0617* (2013.01); *H04L 1/00* (2013.01);
(Continued)

(58) Field of Classification Search
CPC .... H04B 7/024; H04B 7/0452; H04B 7/0617; H04L 1/00; H04W 48/00
See application file for complete search history.

(56) References Cited

U.S. PATENT DOCUMENTS

2012/0057515 A1* 3/2012 Wu ................. H04L 12/189
                                                    370/312
2012/0114056 A1  5/2012 Jafarkhani et al.
(Continued)

FOREIGN PATENT DOCUMENTS

KR    10-2010-0099453 A    9/2010
KR    10-2011-0006006 A    1/2011
(Continued)

OTHER PUBLICATIONS

Shyamnath Gollakota et al., "Interference Alignment and Cancellation", SIGCOMM'09, Aug. 17-21, 2009, pp. 1-12.
(Continued)

Primary Examiner — Chi H Pham
Assistant Examiner — Weibin Huang

(57) ABSTRACT

Disclosed is a communication method using interference alignment in a wireless local area network (WLAN). An access point (AP) according to one embodiment may receive first channel information between a station associated with the AP and the AP and second channel information between
(Continued)

the station and a neighboring AP to perform interference alignment in cooperation with the AP from the station, and perform interference alignment based on the first channel information and the second channel information.

16 Claims, 21 Drawing Sheets

(51) Int. Cl.
H04B 7/0452 (2017.01)
H04L 1/00 (2006.01)
H04W 48/00 (2009.01)
H04W 84/12 (2009.01)
H04W 88/08 (2009.01)

(52) U.S. Cl.
CPC ............ *H04W 48/00* (2013.01); *H04W 84/12* (2013.01); *H04W 88/08* (2013.01)

(56) References Cited

U.S. PATENT DOCUMENTS

2013/0344908 A1* 12/2013 Hwang ................ H04W 16/14
455/501
2014/0003274 A1* 1/2014 Clerckx .............. H04L 25/0204
370/252
2014/0078976 A1* 3/2014 Novak .................. H04W 24/02
370/329
2014/0200010 A1* 7/2014 Jose ..................... H04B 7/0413
455/450

FOREIGN PATENT DOCUMENTS

KR 10-2012-0003487 A 1/2012
KR 10-2012-0031700 A 4/2012
KR 10-2012-0127833 A 11/2012
WO WO 2010/123700 A1 10/2010

OTHER PUBLICATIONS

Krishna Gomadam et al., "Approaching the Capacity of Wireless Networks through Distributed Interference Alignment", Mar. 26, 2008, pp. 1-10.

International Search Report for International Patent Application No. PCT/KR2014/008360 filed Sep. 5, 2014.

* cited by examiner

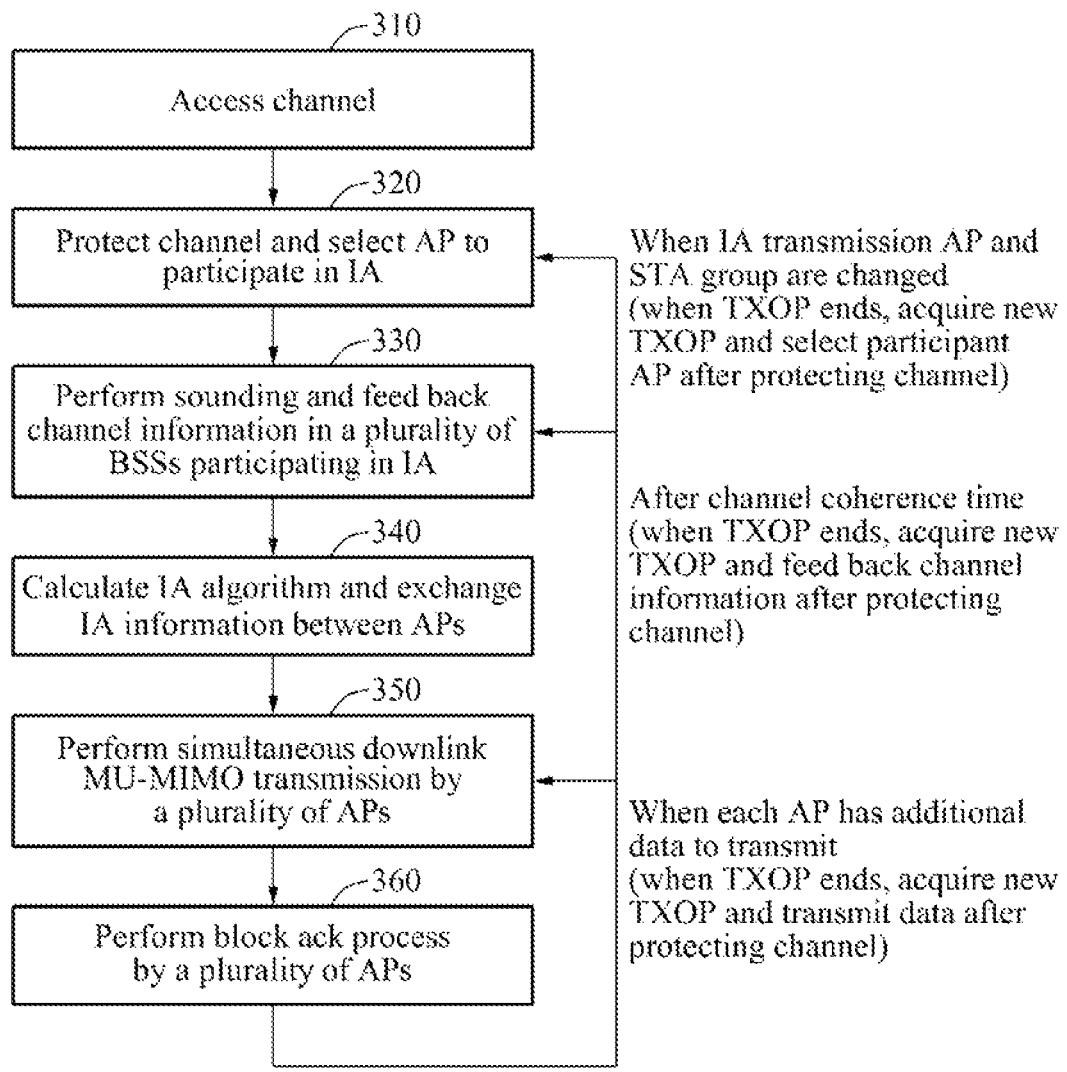

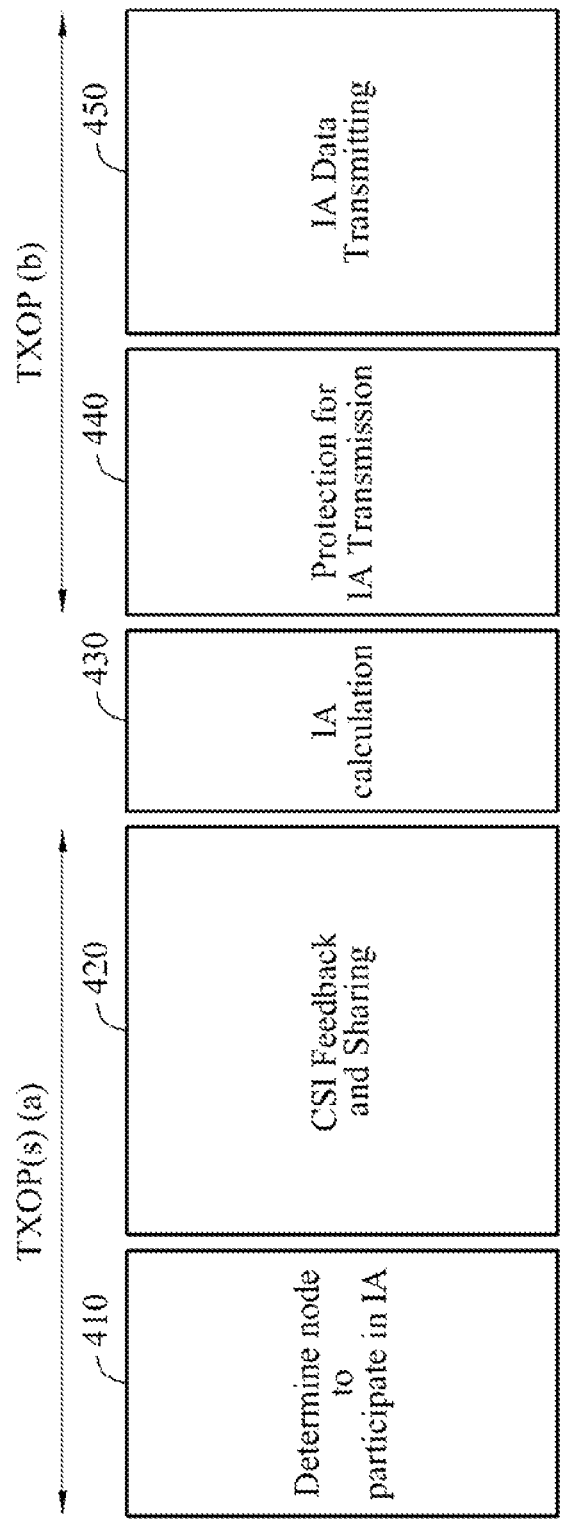

FIG. 8B

| Number of MU STA (AP1) | Number of MU STA (AP2) | Number of MU STA (AP3) | Number of MU STA (AP4) | Reserved |
|---|---|---|---|---|
| 821 | 822 | 823 | 824 | |

Bits: 3, 3, 3, 3, 4

COMMUNICATION METHOD USING INTERFERENCE ALIGNMENT IN WIRELESS LAN

CROSS-REFERENCE TO RELATED APPLICATIONS

The present specification is a U.S. National Stage of International Patent Application No. PCT/KR2014/008360 filed Sep. 5, 2014, which claims priority to and the benefit of Korean Patent Application Nos. 10-2013-0107587 and 10-2014-0117232 filed in the Korean Intellectual Property Office on Sep. 6, 2013 and Sep. 3, 2014, respectively, the entire contents of which are incorporated herein by reference.

TECHNICAL FIELD

Exemplary embodiments relate to a communication method using interference alignment in a wireless local area network.

BACKGROUND ART

With supply of smartphones, use of wireless local area networks (WLANs) explosively increases. Accordingly, an Overlapping Basic Service Set (OBSS) environment may be created.

FIG. 1 illustrates an interference situation occurring in an OBSS environment. Due to saturated frequency bands employed for WLANs and impossible centralized coordination between access points (APs) in WLAN technology, performance deterioration in WLAN communications by interference may be serious in the OBSS environment.

DISCLOSURE OF INVENTION

Technical Problems

An aspect of the present invention is to provide a method of removing interference between access points (APs) in an Overlapping Basic Service Set (OBSS) environment in a wireless local area network (WLAN).

Technical Solutions

According to an aspect of the present invention, there is provided an operation method of an access point (AP) including determining at least one neighboring AP to perform interference alignment (IA) in cooperation with the AP; receiving first channel information between at least one station associated with the AP and the AP and second channel information between the at least one station and the at least one neighboring AP from the at least one station; acquiring IA information based on the first channel information and the second channel information; and transmitting data based on the IA information.

The determining may include transmitting an IA-Request to Send (RTS) frame including a candidate AP list to the at least one neighboring AP; transmitting a Clear to Send (CTS)-Poll frame to a first neighboring AP included in the candidate AP list; and determining the first neighboring AP as an IA participant node when an IA-CTS frame is received from the first neighboring AP.

The receiving may include transmitting an IA Null Data Packet (NDP) Announcement frame including an AP list and an station information (STA Info) list to the at least one neighboring AP and the at least one station; transmitting an NDP to the at least one station; and transmitting an AP-Poll frame of a predetermined type to a next neighboring AP on the AP list.

A neighboring AP corresponding to an address of a Receiver Address (RA) field included in the AP-Poll frame of the predetermined type may reset a Network Allocation Vector (NAV), transmit the IA NDP Announcement frame to stations associated with the neighboring AP, and transmit an NDP to the stations.

The receiving may include transmitting an IA Beamforming (BF) Report Poll frame to the at least one station; receiving a BF Report frame including the first channel information and the second channel information from the at least one station; and transmitting an AP-Poll frame of a predetermined type to a next neighboring AP on an AP list.

The BF Report Poll frame may include a Segment Retransmission Bitmap field for the AP and a Segment Retransmission Bitmap field for the at least one neighboring AP.

A neighboring AP corresponding to an address of an RA field included in the AP-Poll frame of the predetermined type may reset an NAV, transmit the IA BF Report Poll frame to stations associated with the neighboring AP, and receive a BF Report frame from the stations.

The receiving may further include determining a neighboring AP which needs to additionally receive a BF Report frame; and transmitting the AP-Poll frame of the predetermined type to the determined neighboring AP.

The acquiring may include generating IA calculation information for the AP based on the first channel information and the second channel information; transmitting the IA calculation information for the AP to the at least one neighboring AP; and receiving IA calculation information for the at least one neighboring AP from the at least one neighboring AP.

When the IA calculation information for the at least one neighboring AP is received via a cable, expected data transmission duration for the at least one neighboring AP may be further received.

The transmitting may include transmitting a multicast RTS frame to the at least one neighboring AP; and receiving a multicast CTS frame from the at least one neighboring AP.

The transmitting may include transmitting an IA Synchronization (Synch) frame to the at least one neighboring AP; and transmitting downlink data simultaneously with the at least one neighboring AP during a transmission duration included in the IA Synch frame.

A neighboring AP corresponding to an address of an AP Basic Service Set Identification (BSSID) field included in the IA Synch frame may reset an NAV and transmit downlink data after SIFS using IA.

The transmitting may include transmitting a Block Acknowledgement (Ack) Request (BAR) frame to the at least one station; receiving a Block Ack (BA) frame from the at least one station; and transmitting an AP-Poll frame of a predetermined type to a next neighboring AP based on order information on APs included in an IA Synch frame.

A neighboring AP corresponding to an address of an RA field included in the AP-Poll frame of the predetermined type may reset an NAV, transmit the BAR frame to stations associated with the neighboring AP, and receive the BA frame from the stations.

The transmitting may include receiving an AP-Poll frame of a predetermined type from the at least one neighboring AP; determining neighboring APs which need to additionally transmit data based on a more data bit included in the AP-Poll frame of the predetermined type; and transmitting an IA Synch frame to the determined neighboring APs.

The first channel information may be channel information estimated from an NDP received from the AP directly associated with the at least one station, and the second channel information may be channel information estimated from an NDP received from the at least one neighboring AP which is not associated with the at least one station but belongs to the same IA transmission group.

BRIEF DESCRIPTION OF DRAWINGS

FIG. 3 illustrates an IA implementation procedure according to an exemplary embodiment.

FIGS. 4A to 4F illustrate an IA protocol procedure according to an embodiment.

FIG. 8B illustrates a Group Member Indication Bitmap field according to an embodiment.

DETAILED DESCRIPTION OF EXEMPLARY EMBODIMENTS

Hereinafter, exemplary embodiments will be described in detail with reference to the accompanying drawings.

Figure 1:
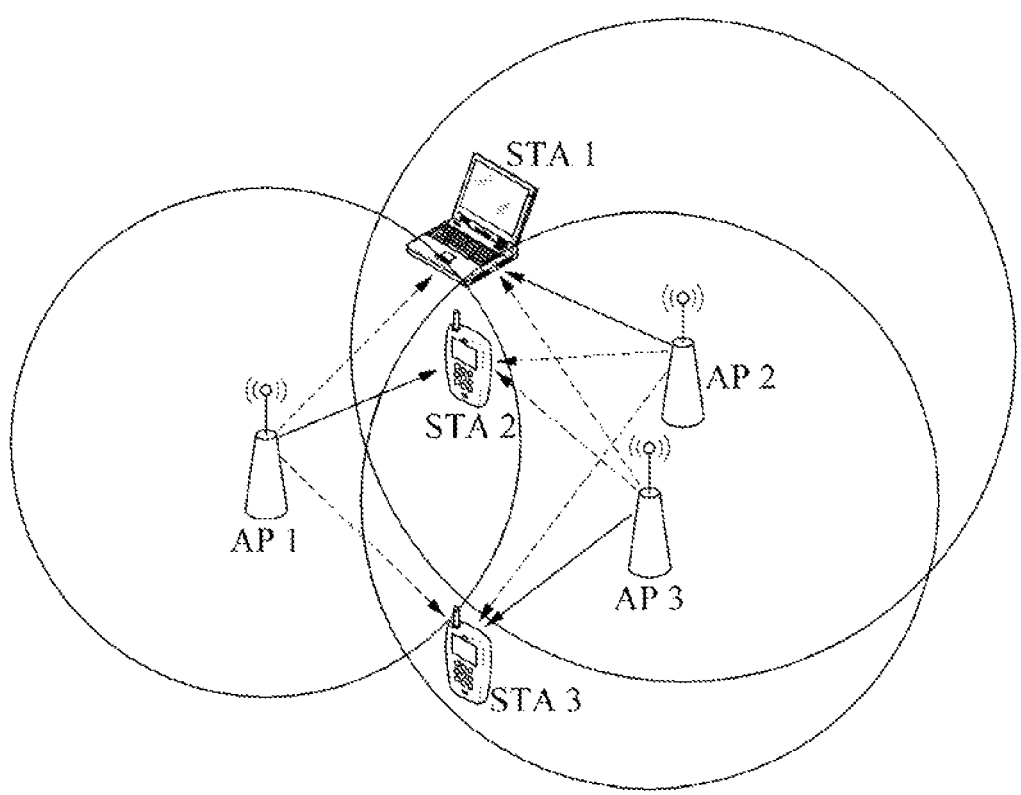
FIG. 1 illustrates an interference situation occurring in an overlapping basic service set (OBSS).
Figure 2:
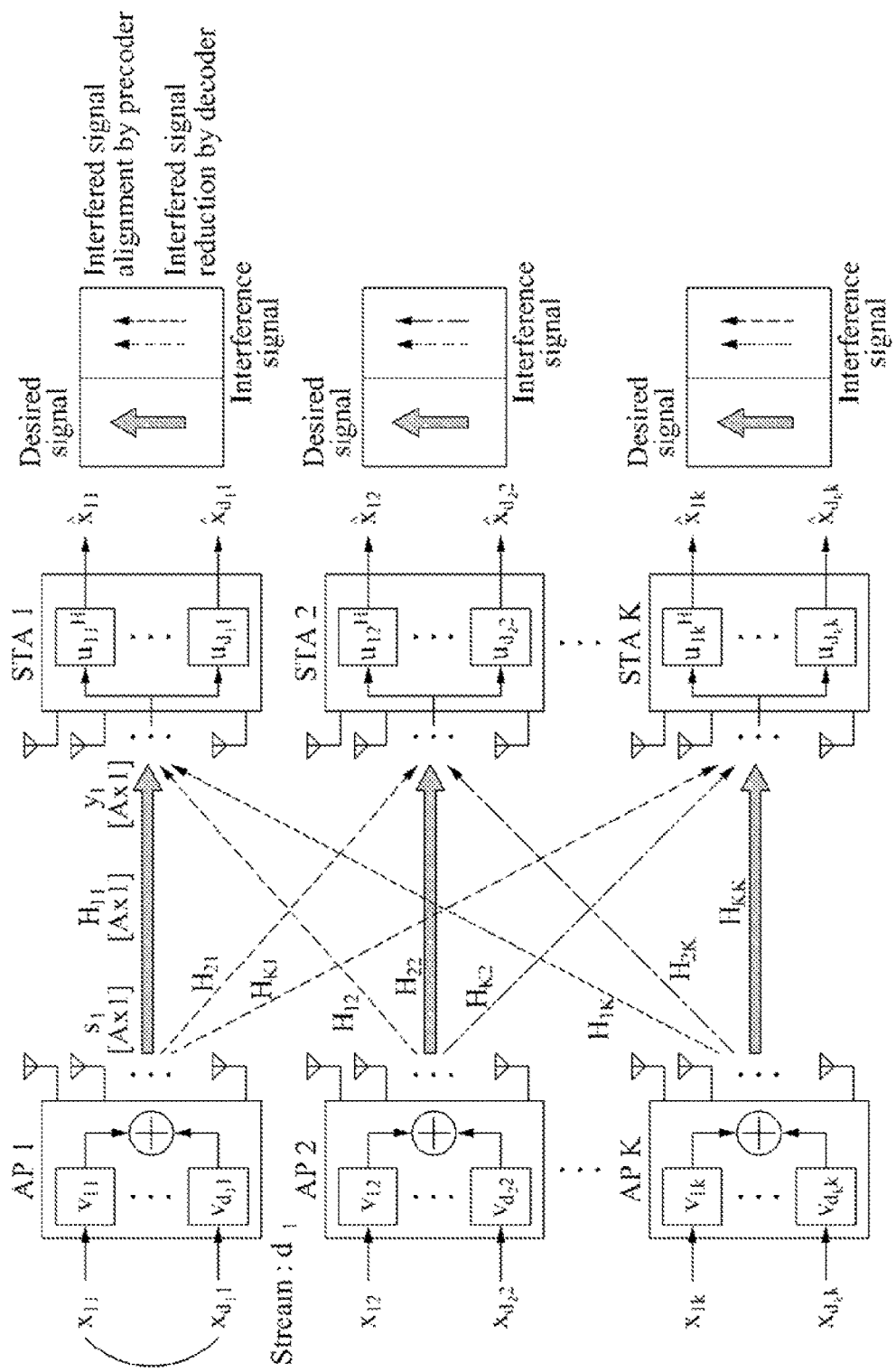
FIG. 2 illustrates an idea of interference alignment (IA) according to an exemplary embodiment.

FIG. 2 illustrates an idea of interference alignment according to an exemplary embodiment. Interference alignment (IA) is a technique for resolving a decrease in transmission performance due to interference between access points (APs) using the same frequency in a wireless channel environment in which the APs overlap each other, which controls interference between the APs in wireless transmission to enhance transmission efficiency.

To perform IA in a wireless local area network (WLAN), IA media access control (MAC) protocols for selecting an AP group to perform IA, feeding back sounding/channel statuses, exchanging channel information between Basic Service Sets (BBSs), sharing a transmit opportunity (TXOP) acquired by other APs, protecting a channel between different APs, and performing synchronization for simultaneous transmission by different APs in the same channel are necessary.

Exemplary embodiments may provide MAC protocols for IA in a WLAN. IA schemes in a WLAN according to exemplary embodiments control interference between APs through coordination between APs to remarkably enhance transmission efficiency in an Overlapping Basic Service Set (OBSS).

Coordination methods between APs according to exemplary embodiments, for example, methods of selecting an AP group to coordinate with, exchanging channel information between BBSs, sharing a TXOP acquired by other APs and protecting a channel between different APs and a synchronization method for simultaneous transmission by different APs in the same channel, may be applicable not only to IA but also to cooperative communication based on coordination between a plurality of APs. The coordination methods between the AP according to the exemplary embodiments may be applied in various ways in order to improve transmission efficiency in an OBSS environment.

FIG. 3 illustrates an IA implementation procedure according to an exemplary embodiment, more particularly a simplified procedure of processing an IA protocol according to exemplary embodiments.

Referring to FIG. 3, in operation 310, an AP which first accesses a channel to conduct IA transmission may operate as a master AP. The master AP may control an overall protocol sequence.

In operation 320, the master AP conducts a frame exchange for protecting a channel or protocol sequence. The master AP performs IA to identify whether candidate APs to simultaneously transmit data participate in IA and selects an AP to participate in IA. Hereinafter, a candidate AP may refer to at least one AP selected by the master AP among neighboring APs of the master AP.

In operation 330, after APs to participate in transmission using IA (hereinafter, "participant AP") are determined, each participant AP performs sounding and receives feedback on channel information in each BSS. Here, stations (STAs) belonging to each AP feed channel status information on not only the AP of a BSS that the STAs belong to but also other APs participating in IA back to the AP of the BSS of the STAs.

In operation 340, the APs implement an IA algorithm and exchange IA information with each other.

In operation 350, the master AP transmits a synchronization (synch) frame for enabling the APs to simultaneously transmit data, and the participant APs receiving the synch frame align interference based on the exchanged IA information and simultaneously transmit data. Each of the APs may use multi-user multiple-input and multiple-output (MU-MIMO) to simultaneously transmit data to a plurality of STAs associated with each AP or use single-user MIMO to transmit data.

In operation 360, each of the APs performs a block acknowledgement (Ack) responding process with the STAs which are associated with each AP and receive the data.

When there is additional data to transmit, the participant APs in IA transmit information indicating that there is additional data to transmit to the master AP. The master AP transmits a synch frame only to APs having additional data to transmit to perform data transmission and the block Ack responding process. In this case, a process of selecting a participant AP may be omitted. Also, if there is an AP leaving an IA group but no AP is newly added thereto and not much time has passed since channel sounding/feedback, IA algorithm calculation and IA information exchanges may be omitted. Further, among the above operations, the synch frame transmission, data transmission and block Ack responding processes may be carried out only.

Here, when a TXOP ends or is insufficient in previous transmission, the master AP may newly access the channel to obtain a TXOP. In this case, the channel is protected through Request to Send/Clear to Send (RTS/CTS) exchanges before synch frame transmission and data transmission.

Even though data transmission via IA (hereinafter, "IA data transmission") continues without adding any new AP to the IA group, a channel status changes after a predetermined coherence time, and thus the participant APs in IA may perform channel sounding and feedback, IA algorithm calculation, and IA information exchanges between the APs again after the coherence time.

When the IA group is changed, for example, by adding a new AP, the procedure may be repeated from the process of selecting the participant AP in IA.

FIGS. 4A to 4F illustrate an IA protocol procedure according to an embodiment. Detailed operations shown in FIGS. 4A to 4F may be modified variously.

IA is needed when APs are close to each other and thus transmission areas thereof substantially overlap with each other. In this case, APs participating in IA may listen to beacons and transmission frames of counterpart APs. However, part of STAs in a BSS created by each AP may be hidden from other APs participating in IA. The IA protocol procedure according to the embodiment is designed to be robust so as to operate even when part of STAs in a BSS created by each AP may be hidden from other APs participating in IA and does not rely on a particular IA algorithm.

For convenience, the following description will be made with reference to an illustrative case where each AP employs MU-MIMO for transmission to STAs, but SU-MIMO transmission is also available with the same protocol. For example, SU-MIMO may use the same overall protocol procedure as for MU-MIMO except that a transmission target for each AP is a single STA.

An overall flow of the protocol procedure according to the embodiment will be described below with reference to FIGS. 4A to 4F. Detailed illustrative operations of the protocol procedure will be mentioned in describing a frame format.

[1] Determining Node to Participate in IA in Operation 410

Figure 4B:
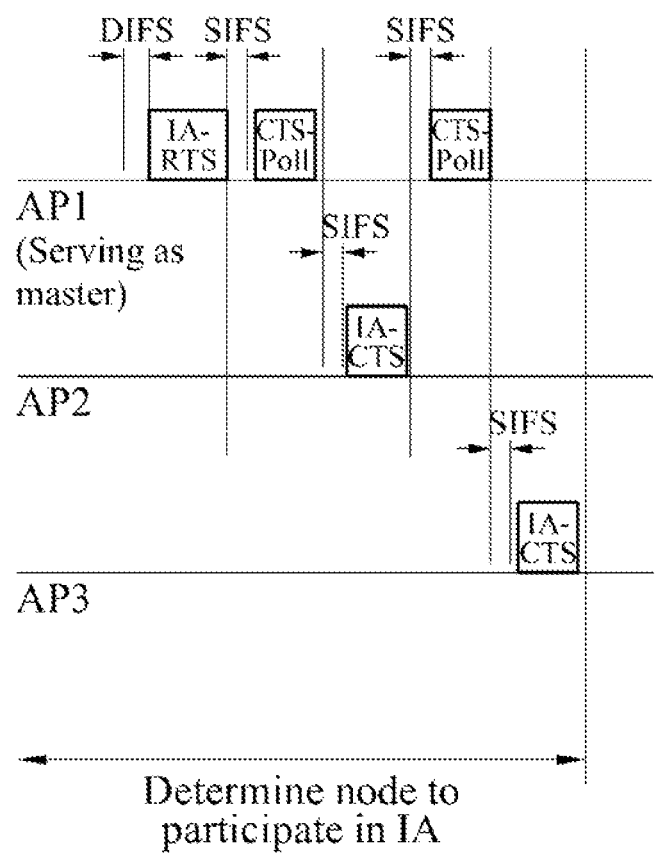

Referring to FIG. 4B, an AP that first accesses a channel to conduct IA transmission operates as a master AP. Hereinafter, an AP that first accesses a channel to conduct IA transmission may be referred to as a 1st AP or AP1. The master AP transmits an Interference Alignment-Request to Send (IA-RTS) frame including a list of candidate APs ("AP list") to participate in an IA transmission group. The master AP sequentially transmits a Clear to Send (CTS)-Poll frame to the APs designated in the IA-RTS frame and receives an IA-CTS frame in response. Only a candidate that intends to participate in IA transmission responds with an IA-CTS frame. The candidate APs are polled in order on the AP list. When there is no response from the AP in Short Inter Frame Space (SIFS) after the APs are polled, the master AP transmits a CTS-Poll frame to the AP again to request a response or transmits a CTS-Poll frame to a next AP on the AP list after Point Coordination Function (PCF) Inter Frame Space (PIFS) since the CTS-Poll frame.

[2] Transmitting Null Data Packet (NDP) of Feeding Back and Sharing Channel State Information (CSI) in Operation 420

Figure 4C:
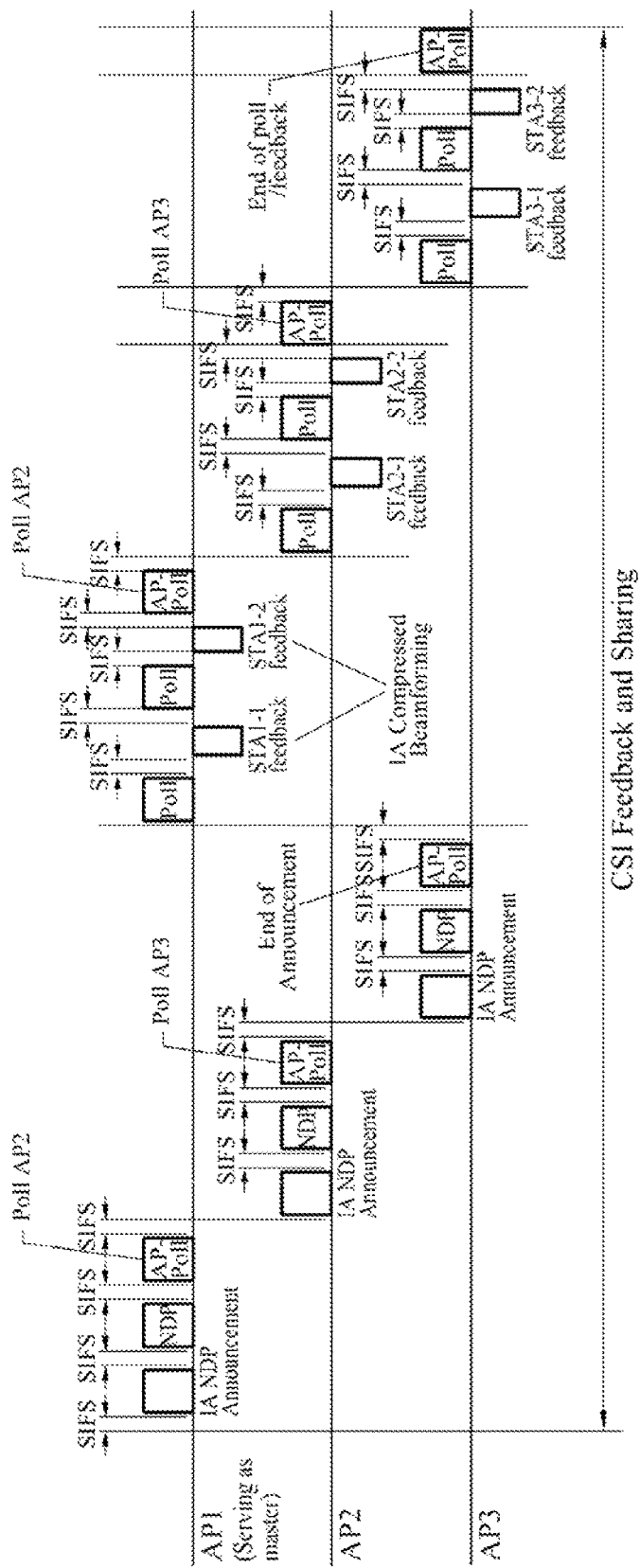

Referring to FIG. 4C, after receiving all IA-CTS frames, the master AP selects a predetermined number of participant APs in IA (or participant APs in sounding), for example, four participant APs. The master AP may receive as many IA-CTS frames as a maximum number of participant APs, or receive a number of IA-CTS frames greater than the maximum number and select part of APs to participate in IA.

The master AP transmits an IA NDP Announcement frame including an AP list of a sounding group (or IA transmission group) and an STA information (Info) list of an MU-MIMO (or SU-MIMO) STA as an IA transmission target which belongs to each AP. Here, the master AP may acquire the STA Info list of the MU-MIMO (or SU-MIMO) STA as the IA transmission target which belongs to each AP using an IA-CTS frame received from each AP.

Each STA as a MU-MIMO (or SU-MIMO) transmission target of each IA transmission participant AP may recognize through the IA NDP Announcement frame that the STA is a sounding target for IA MU-MIMO (or SU-MIMO) transmission and also identify an IA transmission group AP list (BSS identification (BSSID)) other than the AP associated with the STA. Each STA as the MU-MIMO (or SU-MIMO) transmission target of each IA transmission participant AP may listen to an NDP transmitted from the specified AP and provide feedback on the basis of information acquired from the IA NDP Announcement frame.

APs included in another IA transmission group, such as AP2 and AP3, may listen to the IA NDP Announcement frame transmitted by the master AP and verify that the APs are sounding targets for IA MU-MIMO (or SU-MIMO) transmission. Also, the APs in another IA transmission group, such as AP2 and AP3, transmit the same IA NDP Announcement frame and NDP as transmitted by the master AP1 in an order of the APs listed in the IA NDP Announcement frame so as to consider an STA hidden from other APs. Here, AP2 and AP3 are included in the IA transmission group.

The APs sequentially transmit an IA NDP Announcement frame and then an NDP according to the order thereof listed in the IA NDP Announcement frame. An AP having transmitted an NDP transmits an AP-Poll frame (Type=0: NDP Announcement) to a next AP on the list to explicitly specify the next AP to transmit an IA NDP Announcement frame.

The AP receiving the AP-Poll frame (Type=0) may verify whether a Receiver Address (RA) field of the AP-Poll frame (Type=0) indicates the AP. The AP which receives the AP-Poll frame (Type=0) with an RA field indicating the AP resets a set Network Allocation Vector (NAV), transmits an IA NDP Announcement frame thereof, and transmits an NDP. When there is a next AP, the AP receiving the AP-Poll frame (Type=0) transmits an AP-Poll frame (Type=0) to the next AP.

[3] Transmitting Beamforming Report of Feeding Back and Sharing CSI in Operation 420

Referring to FIG. 4C, after the IA NDP Announcement/NDP transmission process is finished, the master AP may transmit an IA Beamforming Report Poll frame to MU-MIMO (or SU-MIMO) STAs thereof and receives Beamforming Report.

Here, processes of transmitting an IA Beamforming Report Poll frame and feeding back a Beamforming Report frame may be performed in accordance with IEEE 802.11 ac. Here, according to the embodiment, since a maximum number of APs (for example, four APs) for one STA to sound is one or more, a Segment Retransmission Bitmap field defined in IEEE 802.11ac may be extended to one or more fields (for example, four fields).

Also, to feed back a Beamforming Report frame, a Very High Throughput (VHT) Compressed Beamforming frame defined in IEEE 802.11ac may be used. Here, according to the embodiment, reserved 2 bits of a VHT MIMO Control field may be used to indicate an AP Index. For instance, an AP index may be used to specify which among a plurality of APs feedback is about. Hereinafter, a Beamforming Report frame may be a VHT Compressed Beamforming frame.

When one AP finishes a Beamforming Report Poll/feedback exchange with respect to an MU STA belonging to the AP, the AP transmits an AP-Poll frame (Type: 1, IA-feedback) to a next AP on the AP list of the IA NDP Announcement frame. The AP designated by an RA of the AP-Poll frame (Type: 1) resets an NAV and performs an IA Beamforming Report Poll/feedback exchange. Hereinafter, beamforming is represented as BF.

When all BF Report frames are not received within a TXOP from STAs associated with a specific AP in the IA group, the master AP obtains a next TXOP and transmits IA-Poll (Type: 1) to an AP to conduct a BF report poll/feedback exchange so that remaining feedback frames are received.

A last AP in the order transmits IA-Poll (Type: 1) to the master AP to report that the feedback process ends after feedback is finished.

[4] Exchanging IA Calculation Information in Operation 430

Figure 4D:
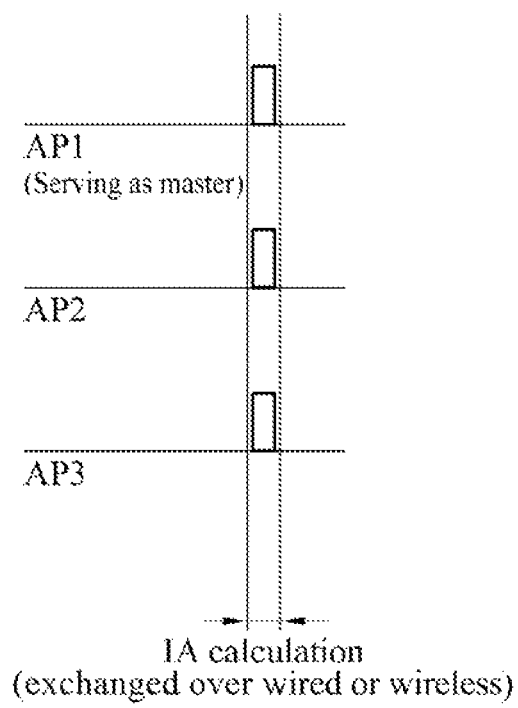

Referring to FIG. 4D, the participant APs in IA exchange IA calculation information via a wired (or wireless) method after the BF feedback process ends.

[5] Transmitting IA Data

The master AP obtains a TXOP and enters a process for transmitting IA data. The process for transmitting IA data may include a protection process for transmitting IA data in operation 440 and a process of transmitting IA data in operation 450.

Figure 4E:
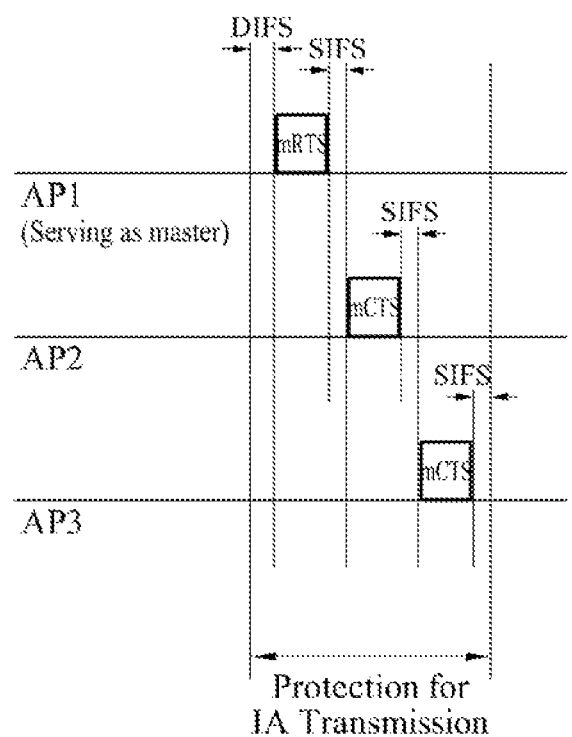

Referring to FIG. 4E, for protection for IA data transmission, the master AP may obtain a channel and protect the channel using a method of exchanging mRTS/mCTS with a plurality of APs according to one embodiment. Alternatively, the master AP may exchange existing RTS/CTS with a plurality of APs.

Figure 4F:
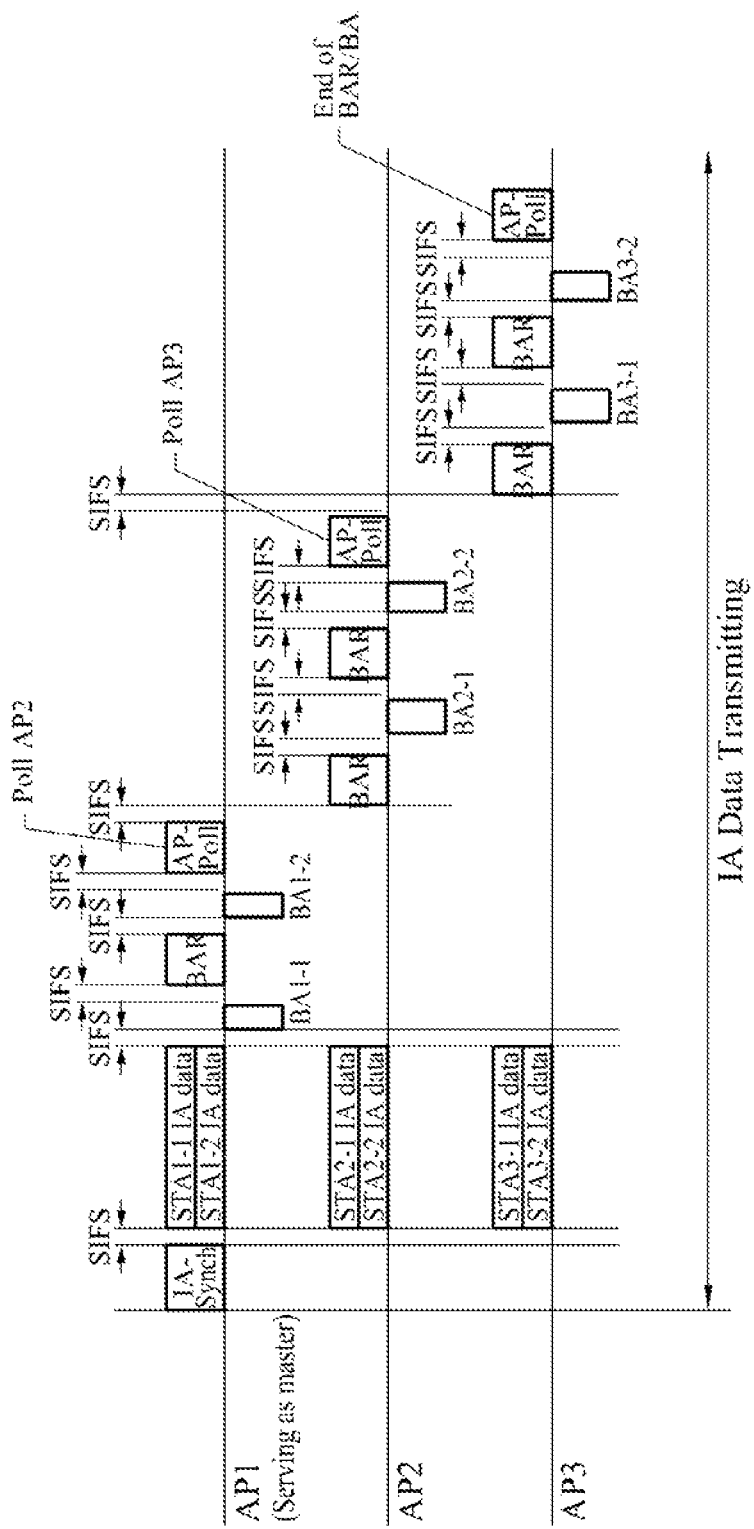

Referring to FIG. 4F, the master AP transmits an IA Synch frame to direct STAs in an IA group to conduct IA transmission. Each AP in the IA transmission group pads and transmits a frame for transmission duration specified by the master AP through the IA Synch frame.

When the APs receiving the IA Synch frame are specified in a BBSID of the IA Synch frame, the APs reset NAVs thereof and simultaneously transmit data to MU STAs thereof using IA after SIFS.

[6] Block Ack Operation

Transmitting IA data in operation 450 may include a Block Ack operation. Referring to FIG. 4F, a Block Ack Request (BAR)/Block Ack (BA) exchange is performed in an order of APs specified in the IA Synch frame. When one AP finishes a BAR/BA exchange with respect to an MU STA belonging to the AP, the AP transmits an AP-Poll frame (Type: 2, BA) to a next AP.

An AP-Poll frame (Type: 2) is for explicitly indicating that a BAR-BA exchange process of a specific AP is finished and directing a next AP to start a BAR/BA exchange. For example, an AP designated by an RA in an AP-Poll frame (Type: 2) resets an NAV and performs a BAR/BA exchange.

A More Data bit of a Frame Control field of an MAC header of the AP-Poll frame (Type: 2) is used to indicate whether there is more data for the AP to simultaneously transmit via IA with the AP-Poll frame (Type: 2). The last AP on the AP list transmits an AP-Poll frame (Type: 2) to the master AP when a BAR/BA exchange is finished.

When there is an AP which transmits an AP-Poll frame (Type: 2) with a More Data bit of an MAC header set to 1 or when the master AP has data to transmit via IA, the master AP may conduct IA transmission using a remaining TXOP. If the remaining TXOP is insufficient, the master AP may acquire a new TXOP and transmit an IA Synch frame including only an AP transmitting an AP-Poll frame (Type: 2) with a More Data bit of 1 in the list in order to continue IA transmission.

Frame Format and Detailed Protocol Procedure

Frame formats used for an IA protocol and detailed protocol procedures associated with the formats are as follows. The following frame formats are provided for illustrative purposes only, and detailed fields and sequence thereof may be modified or combined in various ways. The following detailed protocol procedures are also provided for illustrative purposes only, and details thereof may be modified and combined. In addition, a field length is provided for illustrative purposes only and may vary if necessary.

(A) IA-RTS Frame

Figure 5A:
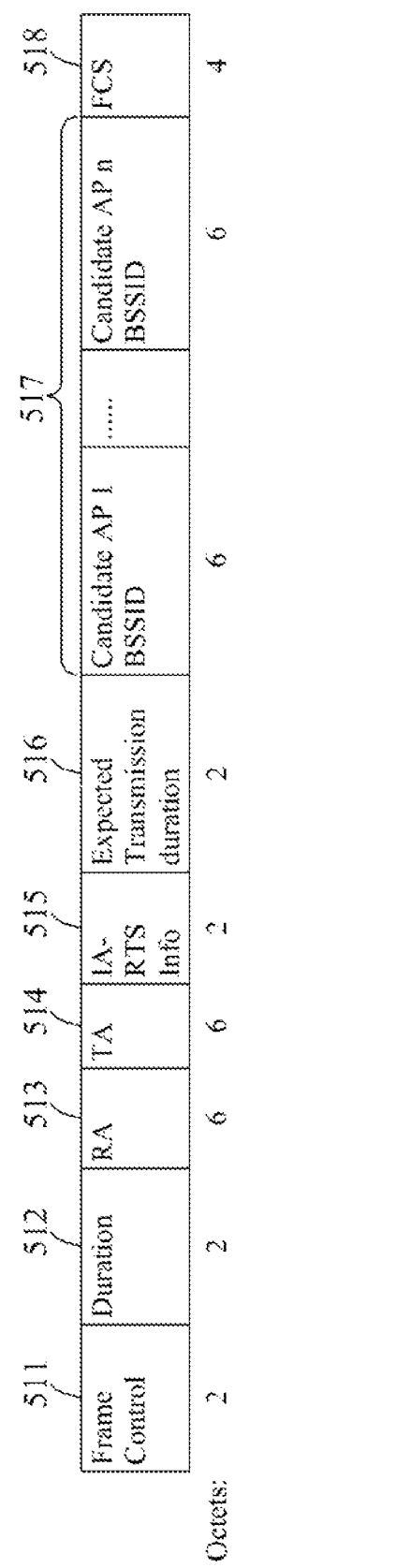
FIG. 5A illustrates an IA-RTS frame according to an embodiment.
Figure 5B:
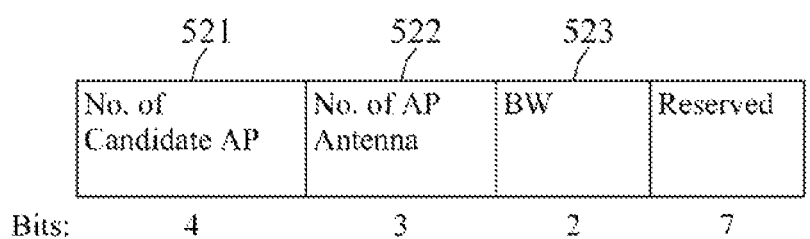
FIG. 5B illustrates an IA-RTS Info field according to an embodiment.

FIG. 5A illustrates an IA-RTS frame according to an embodiment, and FIG. 5B illustrates an IA-RTS Info field according to an embodiment.

An AP which first acquires a channel and initiates IA transmission serves as a master AP. The master AP transmits an IA-RTS frame including a list of candidate APs to participate in IA and determines a participant AP in IA transmission. Hereinafter, the master AP may be referred to as a 1st AP or AP1.

The IA-RTS frame includes at least one of a Frame Control field 511, a Duration field 512, an RA field 513, a Transmitter Address (TA) field 514, an IA-RTS Info field 515, an Expected Transmission duration field 516, a candidate AP list 517, and an FCS field 518.

The TA field indicates an address (BSSID) of an AP transmitting the IA-RTS frame (for example, the mater AP). The Duration field indicates duration of determining an IA participating node and receiving CSI feedback. An IA protocol sequence from a third party AP/STA is protected through the Duration field.

When the feedback is long, the master AP may set the Duration field to a maximum TXOP (max TXOP). The master AP may acquire a new channel after the maximum TXOP and transmits an AP-Poll frame to an AP which does not finish feedback so that a feedback sequence continues to be carried out.

When a period from determining an IA participating node to transmitting IA data is possibly set in one TXOP which does not exceed the maximum due to omission of a sounding process, the master AP may set the Duration field to the period from determining the IA participating node to transmitting the IA data. In this case, an mRTS/mCTS exchange just before transmitting an IA-Synch frame may be omitted.

When there is one candidate AP, the RA field may be set as an address of the AP. When there is a plurality of candidate APs, the RA field may be set as a broadcast address. In this case, the IA-RTS frame may further include an address list of the IA transmission candidate APs.

The AP transmitting the IA-RTS frame sets an expected transmission duration field of data to transmit using IA within a data transmission TXOP (TXOP (b) in FIG. 4) (for example, in microseconds). Another participant AP may determine whether to participate in IA transmission by referring to the expected transmission duration field. For example, since it is favorable that APs similar in transmission data duration conduct transmission together, participation of the APs may be determined on the basis of whether the APs have similar lengths of transmission data duration.

The IA-RTS Info field includes a Number of Candidate AP field 521, a Number of AP Antenna field 522, and a BW field 523. The Number of Candidate AP field specifies a number of APs included in a candidate AP list (for example, n). The Number of AP Antenna field specifies a number of antennas of the master AP (for example, values 0 to 7 mean 1 to 8 antennas, respectively). The BW field specifies a bandwidth (BW) used by the master AP for transmission (for example, 0 to 3 mean 20, 40, 80 and 160 or 80+80, respectively). For protection, the master AP transmits a corresponding quantity of IA-RTS frames to a bandwidth specified in the BW field as non-High Throughput (HT) duplicate frames.

The master AP sequentially polls candidate APs in an order on a candidate AP list specified in the IA-RTS frame and receives an IA-CTS frame. When there is one target candidate AP, the AP list is omitted, and the master AP transmits a CTS-Poll frame to the AP specified in the RA field. When there is a plurality of target candidate APs, the master AP sequentially transmits a C'S-Poll frame to the APs, from a first AP on the AP candidate list.

A candidate AP responds with an IA-CTS frame only when the AP intends to participate in IA transmission. The candidate AP responds with an IA-CTS frame, ignoring a previously set NAV, when the RA field of the CTS-Poll frame is the same as an address of the AP.

The master AP may receive as many IA-CTS frames as a maximum number of participant APs, or receive a greater number of IA-CTS frames than the maximum number and select part of APs to participate in the IA. In this case, sounding may be performed only on the selected APs.

When there is no response with an IA-CTS frame within SIFS after sending the CTS-Poll frame, the master AP transmits a CTS-Poll frame to an AP not responding after PIFS since a previous CTS-Poll frame has been sent to request a response again, or transmits a CTS-Poll frame to a next AP on the candidate BASSID list to request an IA-CTS frame. When no IA-CTS frame is received, the master AP solely conducts transmission within a TXOP, or transmits a Contention Free-End (CF-End) frame to end the TXOP. As the master AP transmits a CTS-Poll frame immediately without receiving an IA-CTS frame (or when there is one target AP), the master AP may not lose the TXOP even when the first candidate AP has no intention to participate and thus does not transmit an IA-CTS frame.

(B) IA-CTS Frame

Figure 6A:
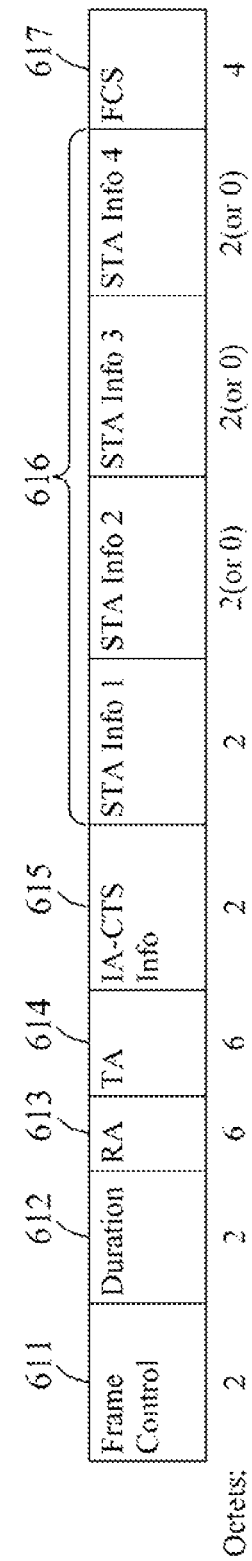
FIG. 6A illustrates an IA-CTS frame according to an embodiment.
Figure 6B:
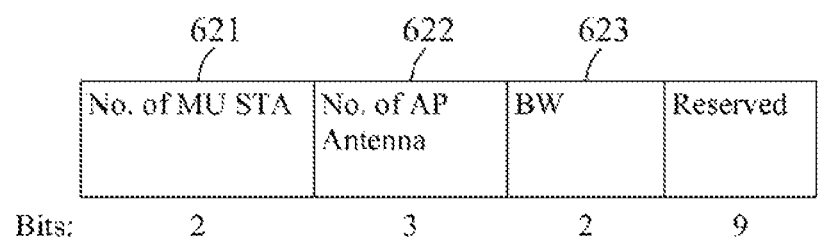
FIG. 6B illustrates an IA-CTS Info field according to an embodiment.
Figure 6C:
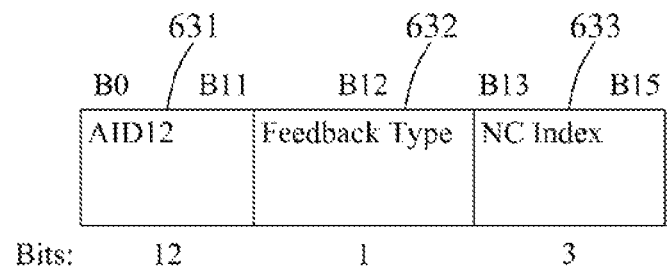
FIG. 6C illustrates an STA Info field according to an embodiment.

FIG. 6A illustrates an IA-CTS frame according to an embodiment, FIG. 6B illustrates an IA-CTS Info field according to an embodiment, and FIG. 6C illustrates an STA Info field according to an embodiment.

The IA-CTS frame includes at least one of a Frame Control field 611, a Duration field 612, an RA field 613, a TA field 614, an IA-CTS Info field 615, a plurality of (for example, four) IA-STA Info fields 616, and an FCS field 617.

The Duration field IA-RTS may specify a remaining TXOP transmission period on the basis of a period defined in the Duration field of the IA-RTS frame or a Duration field of a CTS-Poll frame. The Duration field may be used for protection.

The IA-CTS Info field includes a Number of MU STA field 621, a Number of AP Antenna field 622, and a BW field 623. The Number of MU STA field specifies a number of STAs (for example, four STAs at most) to which a CTS transmitting AP conducts MU transmission. The Number of AP Antenna field specifies a number of antennas of a responding AP (for example, values 0 to 7 mean 1 to 8 antennas, respectively). The BW field specifies a bandwidth (BW) used by the responding AP for transmission (for example, 0 to 3 mean 20, 40, 80, and 160 or 80+80, respectively).

Each of the plurality of IA-STA Info fields may be the same as an STA Info field defined in IEEE 802.11ac. For instance, each IA-STA Info field may include an AID field 631, a Feedback Type field 632, and an NC Index field 633.

The responding AP may transmit a corresponding quantity of IA-CTS frames to the bandwidth specified in the BW field as non-HT duplicate frames. For protection, the bandwidth specified in the BW field may be the same as or smaller than the bandwidth specified in the BW field of the IA-RTS frame.

(C) CTS-Poll Frame

Figure 7:
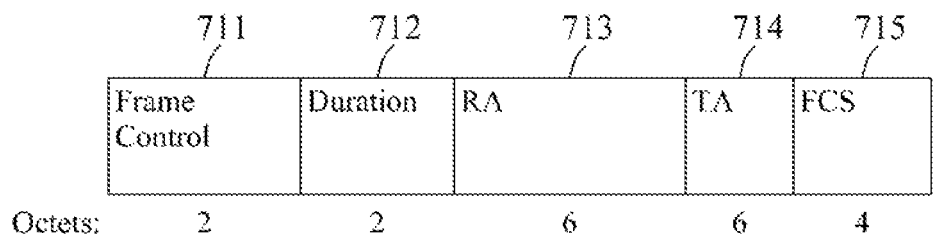
FIG. 7 illustrates a CTS-Poll frame according to an embodiment.

FIG. 7 illustrates a CTS-Poll frame according to an embodiment. The CTS-Poll frame includes at least one of a Frame Control field 711, a Duration field 712, an RA field 713, a TA field 714, and an FCS field 715. The CTS-Poll frame is used to designate a next AP to respond with an IA-CTS frame. The RA field is set to a BSSID of the next AP to respond. The Duration field specifies a remaining TXOP transmission period. The Duration field is used for protection.

(D) IA NDP Announcement Frame

Figure 8A:
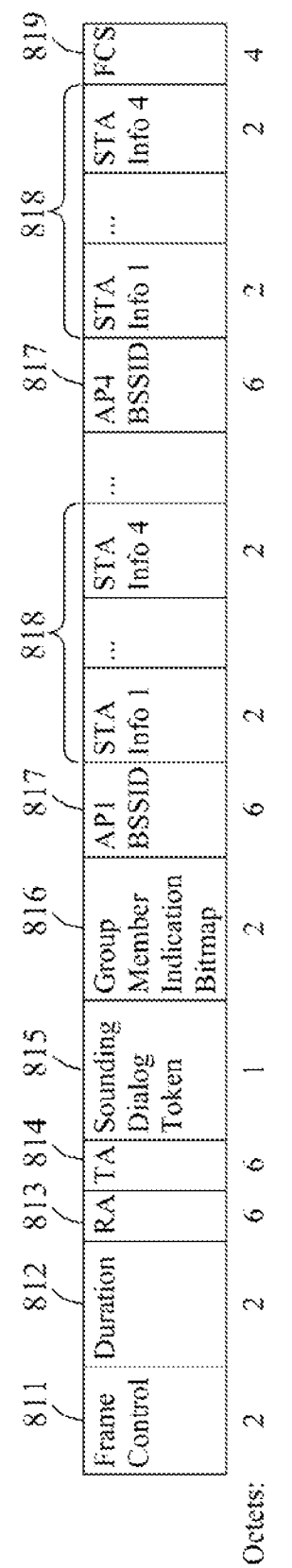
FIG. 8A illustrates an IA-NDP Announcement frame according to an embodiment.
Figure 8C:
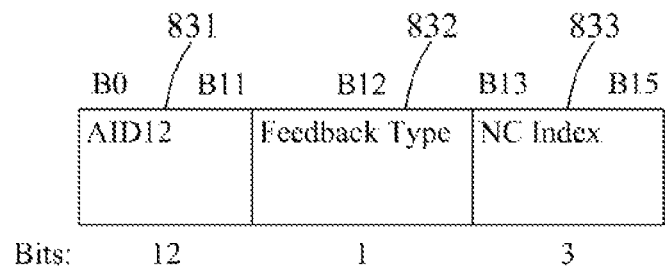
FIG. 8C illustrates an STA Info field according to an embodiment.

FIG. 8A illustrates an IA-NDP Announcement frame according to an embodiment, FIG. 8B illustrates a Group Member Indication Bitmap field according to an embodiment, and FIG. 8C illustrates an STA Info field according to an embodiment.

The IA NDP Announcement frame includes at least one of a Frame Control field 811, a Duration field 812, an RA field 813, a TA field 814, a Sounding Dialog Token field 815, a Group Member Indication Bitmap field 816, a candidate AP list 817, an STA Info list 818 of each AP, and an FCS field 819.

After receiving all IA-CTS frames, the master AP transmits an IA NDP Announcement frame including an AP list of a sounding group (or IA transmission group) and an STA Info list of an STA of each AP (information received via IA-CTS from each AP).

An STA as an MU transmission target of an IA transmission participant AP recognizes through the IA NDP Announcement frame that the STA is a sounding target for IA MU transmission. Further, the STA as the MU transmission target of the IA transmission participant AP may identify an AP list (BSSID) in the IA transmission group other than the AP associated with the STA using the IA NDB Announcement frame. The STA as the MU transmission target of the IA transmission participant AP listens to an NDP transmitted from the AP associated with the STA and another AP in the IA transmission group to provide feedback on the basis of information acquired from the IA NDP Announcement frame.

APs in the IA transmission group, such as AP2 and AP3, may receive the IA NDP Announcement frame from the master AP and verify whether the APs are sounding targets for IA MU transmission on the basis of the IA NDP Announcement frame. Further, the APs in the IA transmission group including AP2 and AP3 transmit the same IA NDP Announcement frame and NDP as transmitted by the master AP in an order of the APs listed in the IA NDP Announcement frame so as to consider an STA hidden from other APs included in the IA transmission group.

The master AP is always positioned at a first place of the AP list. The maximum number of participant APs is plural, for example, four APs including the master AP in the present embodiment. The RA field is set to a broadcast address.

Figure 8D:
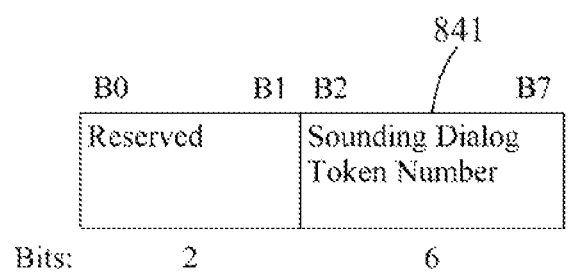
FIG. 8D illustrates a Sounding Dialog Token field according to an embodiment.

FIG. 8D illustrates a Sounding Dialog Token field according to an embodiment. Referring to FIG. 8D, the Sounding Dialog Token field includes a Sounding Dialog Token Number field 841. The Sounding Dialog Token Number field is set to a value for a beamformer to identify the IA NDP Announcement frame. The Sounding Dialog Token Number field may be set based on a Sounding Dialog Token Number field defined in IEEE 802.11ac.

Referring back to FIG. 8A, the Duration field is set to a value obtained by subtracting an IA NDP Announcement transmission period from a period specified in a Duration field of a previous transmission frame. Accordingly, a remaining part of the TXOP may be protected.

The Group Member Indication Bitmap field specifies a BSSID of an AP included in the IA transmission group (or sounding group) or a number of MU STAs of the AP.

For example, the Group Member Indication Bitmap field may include a Number of MU STA (AP1) field 821, a Number of MU STA (AP2) field 822, a Number of MU STA (AP4) field 824, and a Number of MU STA (AP4) field 824. Here, each AP may be allocated a predetermined length of bits. For example, in the present embodiment, each AP may be allocated 3 bits. In this case, the Group Member Indication Bitmap field equal to 000 may mean that there is no STA. In this case, the AP may not be included in the IA NDP Announcement frame. The Group Member Indication Bitmap field equal to 001 may mean that there is one STA. In this case, only one STA Info field may be present following the BSSID of the AP. Further, the Group Member Indication Bitmap field equal to 100 may mean that there are four STAs. 101 to 111 may be reserved.

For instance, when the Group Member Indication Bitmap field is 011 010 001 000, the list included in the IA NDP Announcement frame includes STA Info fields for three STAs associated with AP1, two STAs associated with AP2 and one STA associated with AP3. The IA group includes three APs, and AP4 is not included in the group.

In detail, the list included in the IA NDP Announcement frame includes an AP1 BSSID, STA Info 1 of AP1, STA Info 2 of AP1, STA Info 3 of AP1, an AP2 BSSID, STA Info 1 of AP2, STA Info 2 of AP 2, and STA Info 1 of AP3. Since AP4 has no STA, a BSSID and STA Info of AP4 are not included in the list in the IA NDP Announcement frame.

Each of the SAT Info fields included in the STA Info list may be the same as an STA Info field defined in IEEE 802.11ac. For instance, each STA Info field may include an AID field 831, a Feedback Type field 832, and an NC Index field 833.

The APs sequentially transmit an NDP right after sending an IA NDP Announcement frame according to the order thereof (for example, the order listed in the IA NDP Announcement frame). If BSSs have overlapping ranges such that a transmission target MU STA of each IA participant AP listens to all IA NDP Announcement frames of other APs in the IA group, only the master AP may be allowed to transmit an IA NDP Announcement frame. In this case, the other APs do not send an IA NDP Announcement frame but transmit only an NDP and an AP-Poll frame.

An AP having transmitted an NDP transmits an AP-Poll frame (Type=0: Poll for NDP Announcement) to a next AP on the list to explicitly designate a next AP to transmit an IA NDP Announcement frame. The AP receiving the AP-Poll frame (Type=0), that is, the AP indicated by an RA field of the AP-Poll frame, resets a set NAV, transmits an IA NDP Announcement frame of the AP and transmits an NDP. If there is a next AP, the AP transmits an AP-Poll frame (Type=0) to the next AP.

When one AP transmits an AP-Poll frame but no IA NDP Announcement frame is transmitted from an AP receiving the AP-Poll frame in SIFS, the AP transmitting the AP-Poll frame polls the same AP again with an AP-Poll frame after PIFS or transmits an AP-Poll frame to a subsequent AP. A last AP transmits an AP-Poll frame with an RA field indicating the BSSID of AP1 to the master AP after transmitting an NDP. When the AP-Poll frame is received, the master AP recognizes that an NDP transmission process ends, resets a set NAV and starts Poll transmission to receive a Beamforming Report.

An AP which ultimately fails to transmit an IA NDP Announcement frame/NDP is excluded from the transmission group in IA data transmission.

(E) AP-Poll Frame

Figure 9:
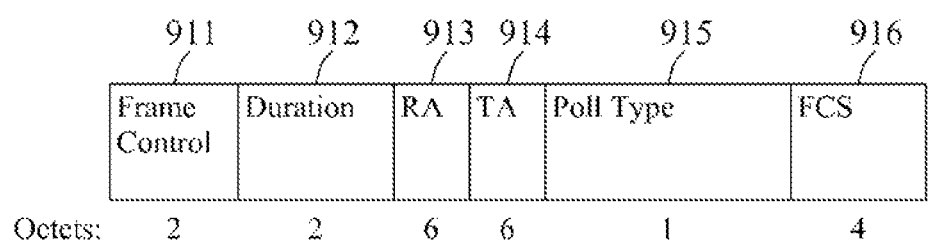
FIG. 9 illustrates an AP-Poll frame according to an embodiment.

FIG. 9 illustrates an AP-Poll frame according to an embodiment. Referring to FIG. 9, the AP-Poll frame includes at least one of a Frame Control field 911, a Duration field 912, an RA field 913, a TA field 914, a Poll Type field 915, and an FCS field 916.

An AP which finishes a frame exchange sequence (for example, IA NDP Announcement/NDP, IA Beamforming Report Poll/IA Beamforming Report, BAR/BA, etc.) transmits an AP-Poll frame to explicitly report that the frame exchange sequence is finished in a BSS of the AP. Moreover, the AP which finishes the frame exchange sequence explicitly designates an AP to perform a frame exchange sequence, subsequent to the AP.

The subsequent AP receiving the AP-Poll frame (for example, an AP having a BSSID corresponding to an RA of the AP-Poll frame) resets an NAV thereof and conducts a frame exchange process (IA NDP Announcement/NDP, Beamforming Report Poll/IA Beamforming Report, and BAR/BA).

When all designated APs sequentially finish the frame exchange sequence, an AP finally performing the frame exchange sequence transmits an AP-Poll to the master AP. After the AP-Poll frame is received, the master AP transmits a frame for a next process. Alternatively, when there is no more data to transmit, the master AP finishes the TXOP. When the AP-Poll frame is received, the master AP resets an NAV thereof.

When the Poll Type field is 0, the AP-Poll frame is a frame for IA NDP Announcement. When the Poll Type field is 1, the AP-Poll frame is a frame for IA-feedback. When the Poll Type field is 2, the AP-Poll frame is a frame for BA. Other values to be specified in the Poll Type field are reserved.

When the Poll Type field is 2, each AP indicates using a More Data bit of a Frame Control field of an MAC header included in the AP-Poll frame whether there is more data for the AP to simultaneously transmit via IA when transmitting the AP-Poll frame (for example, right after data transmission-BA).

When there is an AP transmitting an AP-Poll frame with the More Data bit set to 1 and/or when the master AP has data to simultaneously transmit via IA, the master AP transmits an IA-Synch frame including only an AP with a More Data bit of 1 in previous transmission by using a TXOP remaining right after BAR/BA or by acquiring a new TXOP if the remaining TXOP is insufficient, thereby continuing IA transmission.

When the new TXOP is acquired, protection is performed through transmission of mRTS/mCTS or transmission of a plurality of RTSs/CTSs between APs staying in the IA transmission group, after which IA-Synch frame transmission/data transmission/BA process may be carried out.

(F) IA Beamforming Report Poll Frame

Figure 10:
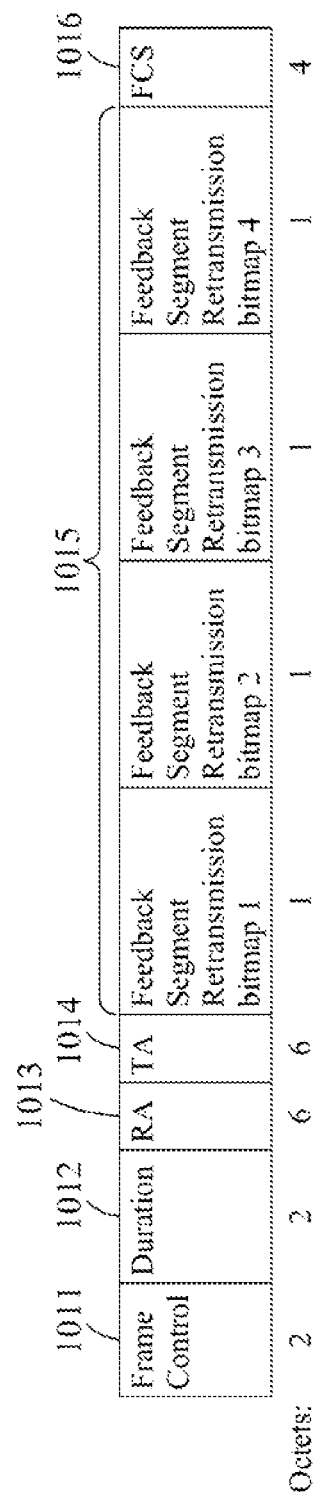
FIG. 10 illustrates an IA Beamforming Report Poll frame according to an embodiment.

FIG. 10 illustrates an IA Beamforming Report Poll frame according to an embodiment. The IA Beamforming Report Poll frame corresponds to a frame specified by Poll of FIG. 4C.

The IA Beamforming Report Poll frame includes at least one of a Frame Control field 1011, a Duration field 1012, an RA field 1013, a TA field 1014, a plurality of Feedback Segment Retransmission bitmap fields 1015, and an FCS field 1016.

The master AP transmits an IA Beamforming Report Poll frames to MU STAs thereof and receives a Beamforming Report frame after IA NDP Announcement/NDP transmission is finished.

IA Beamforming Report Poll frame transmission and Beamforming Report frame reception (feedback) may be performed in accordance with IEEE 802.111ac. Here, according to one embodiment, since one STA performs sounding on a plurality of APs at maximum (for example, four APs in the present embodiment), a Segment Retransmission Bitmap field defined in IEEE 802.11 ac may be extended to a plurality of fields (for example, four fields).

When a Beamforming Report frame for each AP is not divided into segments, a plurality of VHT Compressed Beamforming frames (for example, four frames at most in the present embodiment) may be transmitted per STA. When the Beamforming Report frame for each AP is divided into segments, a number of VHT Compressed Beamforming frames transmitted per STA may increase further. Here, a VHT Compressed Beamforming frame corresponds to a Beamforming Report frame.

For instance, the number of VHT Compressed Beamforming frames transmitted per STA may increase up to four times more than in IEEE 802.11ac, because an STA transmits only a Beamforming Report frame for a BSS of the STA in IEEE 802.11ac, while an STA according to embodiments needs to transmit a Beamforming Report frame even for another AP in the IA group to an AP that the STA belongs to.

To this end, according to exemplary embodiments, an STA transmits one VHT Compressed Beamforming frame modified from IEEE 802.11 ac per AP. Alternatively, when a VHT Compressed Beamforming frame is long, segmentation may be carried out in accordance with IEEE 802.11ac. In this case, a plurality of VHT Compressed Beamforming frames may be transmitted per AP.

Beamforming Report frames are aggregated into one aggregated MAC Protocol Data Unit (A-MPDU) in each poll within a maximum PPDU length and fed back. For instance, when all Beamforming Report frames for all AP groups in the IA group are aggregated into an A-MPDU within the maximum PPDU size, feedback is completed with one poll.

In one embodiment, when there is a plurality of APs, a feedback size is large, making it difficult to aggregate all Beamforming Report frames for all AP groups in the IA group into one A-MPDU within the maximum PPDU size.

In this case, Beamforming Report frames are transmitted separately corresponding to a plurality of polls. Here, one transmitted A-MPDU may include segments for different APs. For instance, a last segment of AP1 and a first segment of AP2 may be aggregated into one A-MPDU. An AP index field is included in a VHT Compressed Beamforming frame to indicate a segment of which AP the VHT Compressed Beamforming frame is. The AP index field may be allocated 0, 1, 2 and 3 in the order of the APs listed in the IA NDP Announcement frame. Accordingly, a maximum number of segments may be fed back at one time.

Bitmaps are presented in the same order as on the AP list specified in the IA NDP Announcement frame. For instance, bitmap 1 is a retransmission bitmap for the master AP, and bitmap 2 is a bitmap for the 2nd AP.

(G) VHT Compressed Beamforming Frame

Figure 11:
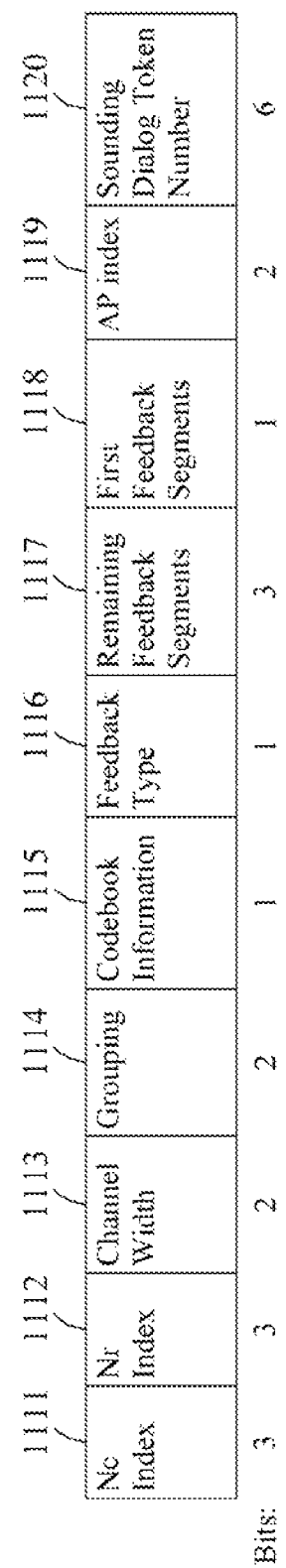
FIG. 11 illustrates a VHT Compressed Beamforming frame according to an embodiment.

FIG. 11 illustrates a VHT Compressed Beamforming frame according to an embodiment. Referring to FIG. 11, the VHT Compressed Beamforming frame includes at least one of an Nc Index field 1111, an Nr Index field 1112, a Channel Width field 1113, a Grouping field 1114, a Codebook Information field 1115, a Feedback Type field 1116, a Remaining Feedback Segments field 1117, a First Feedback Segments field 1118, an AP index field 1119, and a Sounding Dialog Token Number field 1120.

For feedback, a VHT Compressed Beamforming frame defined in IEEE 802.11ac may be used. For example, a frame including a Category field, a VHT Action field, a VHT MIMO Control field, a VHT Compressed Beamforming Report field, and an MU Exclusive Beamforming Report field may be used. Here, reserved 2 bits of the VHT MIMO Control field defined in IEEE 802.11ac may be utilized to indicate an AP index.

Feedback on each NDP is formed of VHT Compressed Beamforming frames, which are aggregated into an A-MPDU within the maximum PPDU range to be transmitted. For example, when a feedback size for each AP (for, four APs) does not exceed the maximum PPDU size, four VHT Compressed Beamforming frames are aggregated into an A-MPDU to be transmitted. When the feedback size exceeds the maximum PPDU size, VHT Compressed Beamforming frames are divided into separate Polls/feedbacks within the maximum PPDU size to be transmitted. A VHT Compressed Beamforming frame for one AP may be divided into segments as specified in a VHT standard and transmitted as Poll/feedback.

An AP Index is indicated using the reserved 2 bits of the VHT MIMO Control field. The AP Index is used to specify which AP feedback is about. For example, AP index 0 indicates feedback on the master AP specified in the IA NDP Announcement frame, and AP index 1, AP index 2 and AP index 3 indicate feedbacks on the 2nd AP, the 3rd AP and the 4th AP, respectively.

An STA may notify an AP which AP feedback is about and/or which position of feedback a segment is at using the AP index and segment information (for example, Remaining Feedback Segments and First Feedback Segment).

When an STA does not listen to an NDP from a specific AP in the IA sounding group, the STA transmits Null feedback. Here, Null feedback may be feedback that is a VHT Compressed Beamforming frame excluding a VHT compressed Beamforming Report and an MU exclusive beamforming report.

When one AP finishes a BF report poll/feedback exchange for an MU STA belonging to the AP, the AP transmits an AP-Poll frame (Type: 1, IA-feedback) to a next AP on the AP list of the IA NDP Announcement frame.

The AP-Poll frame (Type: 1) may explicitly indicate that the BF report poll/feedback exchange of the specific AP is finished. Also, the AP-Poll frame (Type: 1) may direct the next AP to initiate a BF report poll/feedback exchange. For instance, an AP designated by RA in the AP-Poll frame (Type: 1) may reset an NAV and perform an IA Beamforming Report Poll/feedback exchange.

When a last AP on the AP list in the IA NDP Announcement frame finishes a BF report poll/feedback exchange, the AP transmits an AP-Poll frame (Type: 1) to the mater AP. When the AP-Poll frame is received, the master AP resets an NAV thereof. When IA Calculation information is exchanged by a wired method, the master AP transmits CF-End to finish a remaining TXOP if the TXOP remains. When IA Calculation information is exchanged wirelessly, IA Calculation information exchanges may be carried out wirelessly using the remaining TXOP.

In a CSI feedback and sharing process, a specific AP in the IA group may not receive all BF report frames from STAs within a TXOP. In this case, the master AP may acquire a next TXOP and transmit an IA-Poll frame (Type: 1) to an AP to conduct BF report poll/feedback to receive remaining feedback frames (remaining BF report frames). The AP receiving the IA-Poll frame (Type: 1) from the master AP resets an NAV, conducts remaining BF report poll/feedback, and transmits an IA-Poll frame (Type: 1) to a next AP on the list. In this case, before the master AP transmits the IA-Poll frame (Type: 1) after acquiring the channel, protection may be performed through transmission of a plurality of RTSs/CTSs or transmission of mRTS/mCTS between the master AP and APs not finishing a feedback process.

(H) IA Calculation Information Exchange

IA Calculation information may be exchanged by a wired or wireless method.

(a) Exchange by Wired Method

After the beamforming feedback exchange is finished, the IA participant APs exchange IA calculation information with each other via a cable. When the APs are present in the same subnet, IA calculation information is broadcasted via a cable. When the APs are present in different subnets, IA calculation information may be transmitted to different APs. In this case, each AP may transmit IA calculation information thereof to another AP and notify the master AP that IA calculation information is transmitted. Each AP may also notify the master AP of expected duration of data to transmit in IA transmission when IA calculation information is exchanged.

The master AP may acquire a new TXOP for IA data transmission after IA calculation information exchanges are finished. For protection for IA data transmission, the master AP may obtain a channel and perform an mRTS/mCTS exchange. When there are two participant APs, the channel may be protected by exchanging existing RTS/CTS between the APs. When protection is already provided around the IA transmission group APs through exchanges of RTS/CTS, CTS-Poll/IA-CTS or other data frames within the same TXOP, mRTS/mCTS or RTS/CTS exchanges may be omitted.

(b) Exchange by Wireless Method

After the beamforming feedback exchange is finished, the IA participant APs exchange IA calculation information with each other in a wireless manner. In this case, the IA participant APs may transmit IA calculation information thereof to other APs via broadcast or unicast according to the order of the APs listed in the IA NDP Announcement frame. In broadcast, a reduced number of frames are transmitted but an acknowledgement is not received, and thus there may be an AP not receiving IA calculation information. In unicast transmission, reliable transmission is possible due to receipt of an acknowledgement, while a greater number of frames are transmitted.

In broadcast, each AP broadcasts IA calculation information thereof according to the order thereof specified in the IA NDP Announcement frame and transmits an AP-Poll frame to a next AP. The AP receiving the AP-Poll frame resets an NAV thereof and broadcasts IA calculation information thereof. A last AP broadcasts IA calculation information and then transmits an AP-Poll frame to the master AP. The master AP receives the AP-Poll frame, resets an NAV, and transmits an IA-Synch frame in order to enter the IA data transmission process. When a TXOP is insufficient after IA calculation information exchanges, the master AP acquires a new TXOP to transmit the IA-Synch frame. When the new TXOP is acquired, transmission duration may be protected through exchanges of mRTS/mCTS or RTS/CTS between the master AP and the APs in the IA transmission group.

To resolve a reliability issue of a broadcast process, each AP transmits a poll to another AP right after broadcasting IA calculation information thereof, and receives an acknowledgement from the AP receiving the poll, thereby verifying whether the counterpart AP suitably receives the IA calculation information. The destination AP may transmit an acknowledgement only when the IA calculation information is received.

In unicast, the APs sequentially transmit IA calculation information thereof to other APs in the IA group according to the order thereof specified in the IA NDP Announcement frame. For example, when AP1 transmits IA calculation information, AP1 transmits the IA calculation information to AP2 first and receives an acknowledgement of the IA calculation information. Subsequently, AP1 transmits the IA calculation information to AP3 and receives an acknowledgement of the IA calculation information. Next, AP1 transmits an AP-Poll frame to AP2 following AP1 in the order specified in the NDP Announcement frame. When the AP-Poll is received, AP2 resets an NAV, sequentially transmits IA calculation information to AP1 and AP3, and receives acknowledgements.

A last AP transmits an AP-Poll frame to the master AP after finishing unicast of IA calculation information. When the AP-Poll frame is received, the master AP resets an NAV and transmits an IA-Synch frame in order to enter the IA data transmission process. When a TXOP is insufficient after IA calculation information exchanges, the master AP acquires a new TXOP to transmit the IA-Synch frame. When the new TXOP is acquired, transmission duration may be protected through exchanges of mRTS/mCTS or RTS/CTS between the master AP and the APs in the IA transmission group.

When IA calculation information is exchanged wirelessly, an IA calculation frame is large and thus may not be transmitted within one TXOP. In this case, the master AP may acquire a new TXOP, protect the channel using mRTS/mCTS or RTS/CTS, and transmit an AP-Poll frame to a next transmission destination AP. Accordingly, IA calculation information exchanges may be continued.

(I) mRTS Frame

Figure 12A:
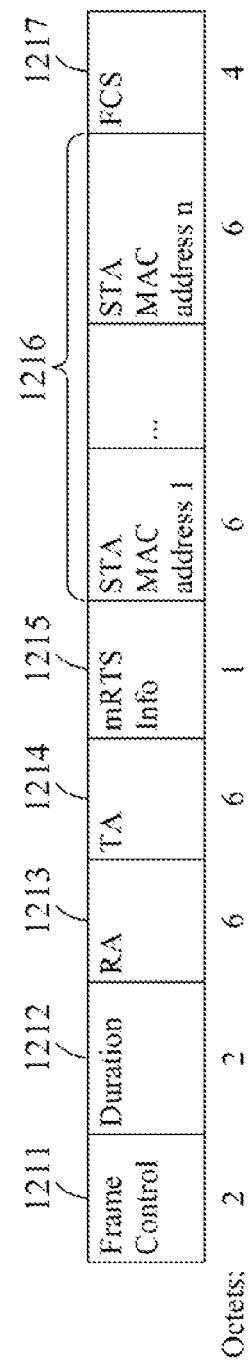
FIG. 12A illustrates an mRTS frame according to an embodiment.

FIG. 12A illustrates an mRTS frame according to an embodiment. Referring to FIG. 12A, the mRTS frame includes at least one of a Frame Control field 1211, a Duration field 1212, an RA field 1213, a TA field 1214, an mRTS Info field 1215, a plurality of STA MAC address fields 1216, and an FCS field 1217.

The mRTS frame is used to protect transmission between a plurality of APs/STAs. Using the mRTS frame may reduce overhead for exchanging RTS/CTS a plurality of times. The RA field of the mRTS frame is set to a broadcast address.

Figure 12B:
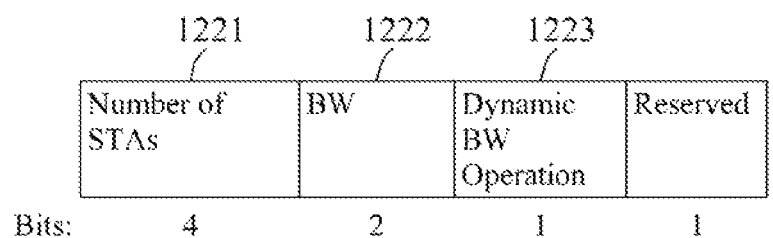
FIG. 12B illustrates an mRTS Info field according to an embodiment.

FIG. 12B illustrates an mRTS Info field according to an embodiment. Referring to FIG. 12B, the mRTS Info field includes at least one of a Number of STAs field 1221, a BW field 1222, and a Dynamic BW operation field 1223.

The Number of STAs field specifies a number of STAs to transmit responding CTS. An mRTS frame includes as many STA addresses as the number specified in the Number of STAs field.

The BW field specifies a bandwidth (BW) used for transmission. For instance, 0 to 3 indicate 20, 40, 80 and 160 or 80+80, respectively. A corresponding quantity of mRTS frames to the BW specified in the BW field is transmitted as non-HT duplicate frames. The Dynamic BW Operation field equal to 0 indicates a static BW operation, and the Dynamic BW Operation equal to 1 indicates a dynamic BW operation.

STAs included in the mRTS frame transmit mCTS at an interval of SIFS in order on the list.

(J) mCTS Frame

Figure 13A:
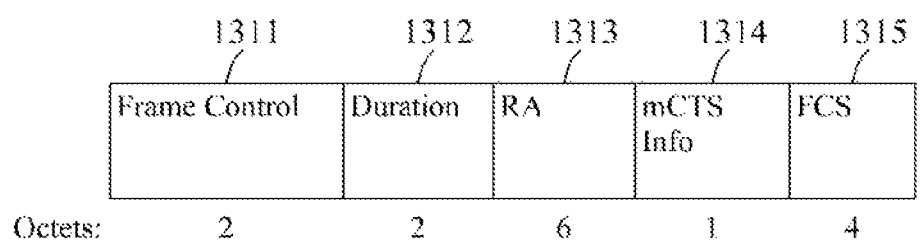
FIG. 13A illustrates an mCTS frame according to an embodiment.

FIG. 13A illustrates an mCTS frame according to an embodiment. Referring to FIG. 13A, the mCTS frame includes at least one of a Frame Control field 1311, a Duration field 1312, an RA field 1313, an mCTS Info field 1314, and an FCS field 1315. STAs included in the mRTS frame transmit an mCTS frame at an interval of SIFS in order on the list.

Figure 13B:
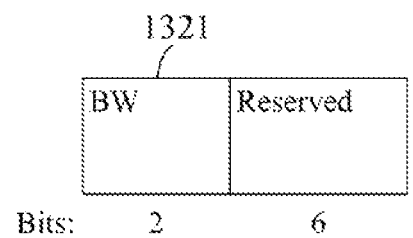
FIG. 13B illustrates an mCTS Info field according to an embodiment.

FIG. 13B illustrates an mCTS Info field according to an embodiment. Referring to FIG. 13B, the mCTS Info field includes a BW field 1321. The BW field specifies a bandwidth (BW) used by a responding STA. For instance, 0 to 3 indicate 20, 40, 80 and 160) or 80+80, respectively. A bandwidth negotiation is carried out to determine based on the Dynamic BW Operation field of the mRTS frame whether to perform a dynamic bandwidth operation or static bandwidth operation.

A responding STA may transmit a corresponding quantity of mCTS frames to a bandwidth specified in the BW field as non-HT duplicate frames. For protection, the bandwidth specified in the BW field may be the same as or smaller than a bandwidth specified in the BW field of the mRTS frame.

A finally determined bandwidth corresponds to a common bandwidth of mRTS/mCTS participant STAs. When an mCTS frame to be transmitted according to the order is not transmitted after SIFS, the master AP acquires a channel through backoff. When there are three or fewer APs (or STAs) to protect, protection is performed by exchanging RTS/CTS twice.

(K) IA Synch Frame

Figure 14:
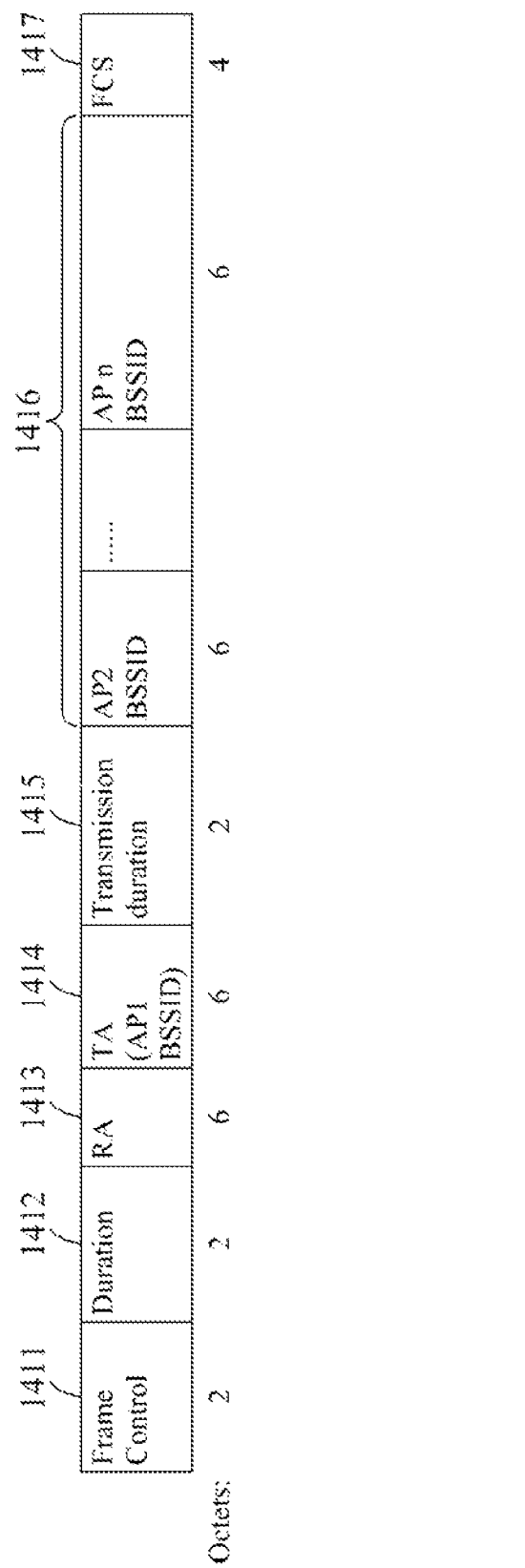
FIG. 14 illustrates an IA Synch frame according to an embodiment.

FIG. 14 illustrates an IA Synch frame according to an embodiment. The master AP transmits an IA Synch frame after acquiring and protecting a channel to direct STAs in the IA group to conduct IA transmission.

The IA Synch frame includes at least one of a Frame Control field 1411, a Duration field 1412, an RA field 1413, a TA field 1414, a Transmission duration field 1415, a plurality of AP BSSID fields 1416, and an FCS field 1417.

The mater AP specifies a value of the Transmission duration field, and each AP included in the IA transmission group transmits a frame via padding to the value of the Transmission duration field. The master AP determines duration for data to transmit via IA. For example, the master AP may determine transmission duration by default based on a period of data for the master AP to transmit and report the determined transmission duration through the IA Synch frame. Alternatively, when IA calculation information is exchanged via a cable, the master AP may receive expected data transmission duration from other participant APs in advance and determine transmission duration based on the expected data transmission duration.

The IA Synch frame includes an AP BSSID list to participate in IA transmission.

When two APs (for example, the master AP and AP2) participate in IA transmission, the RA field is set to an address of AP2, the TA field is set to an address of the master AP, the BSSID list is not included in the IA Synch frame. When three or more APs participate in IA transmission, the RA field is set to a broadcast address and the AP BSSID list includes APs from AP2. The BSSID of the master AP transmitting the IA Synch frame is identified by the TA field of the IA Synch frame and thus is not included in the AP BSSID list.

The APs receiving the IA Synch frame reset NAVs thereof and simultaneously transmit data to MU-MIMO (or SU-MIMO) STAs thereof using IA after SIFS when the APs are specified in the BSSID field of the IA Synch frame.

(L) Detailed Block Ack Process

BAR/BA exchanges are performed according to the order of APs specified in the IA-Synch frame. The master AP always conducts a BAR/BA exchange first.

A BA of a first MU STA of the master AP may be immediately transmitted without a BAR. For example, the BA of the first MU STA of the master AP may be transmitted after SIFS since data transmission. Subsequent STAs transmit a BAR to receive a BA. Here, BAR/BA exchanges may be performed by a method mentioned in IEEE 802.11ac and/or a BAR/BA format defined in IEEE 802.11ac.

When one AP finishes a BAR/BA exchange for an MU STA of the AP, the AP transmits an AP-Poll frame (Type: 2, BA) to a next AP. An AP-Poll frame (Type: 2) An AP-Poll frame (Type: 2) may be used to explicitly indicate that a BAR/BA exchange process of a specific AP is finished. Also, the AP-Poll frame (Type: 2) may allow a next AP to start a BAR/BA exchange. For example, an AP designated by an RA in an AP-Poll frame (Type: 2) resets an NAV and performs a BAR/BA exchange.

A More Data bit of a Frame Control field of an MAC header included in an AP-Poll frame (Type: 2) is used to indicate whether there is more data for an AP to simultaneously transmit via IA with the AP-Poll frame (for example, right after data transmission-BA).

A last AP on the AP list transmits an AP-Poll frame (Type: 2) to the master AP when a BAR/BA exchange is finished. When the AP-Poll frame (Type: 2) is received, the master AP resets an NAV thereof. When there is an AP transmitting an AP-Poll frame (Type: 2) with a More Data bit set of an MAC Header to 1 and/or when the master AP has data to simultaneously transmit via LA, the master AP transmits an IA-Synch frame including only an AP transmitting an AP-Poll frame (Type: 2) with a More Data bit of 1 on the list by using a remaining TXOP or by acquiring a new TXOP if the remaining TXOP is insufficient, thereby continuing IA transmission. When the new TXOP is acquired, protection is performed through transmission of mRTS/mCTS or transmission of a plurality of RTSs/CTSs between APs staying in the IA transmission group, after which IA-Synch frame transmission/data transmission/BA process may be carried out.

In BAR/BA exchanges, when a specific AP and subsequent APs in the IA group do not completely conduct BAR/BA exchanges within a TXOP, the master AP may acquire a next TXOP and transmits an IA-Poll frame (Type: 2) to the APs to conduct BAR/BA exchanges to finish the BAR/BA exchanges. The APs receiving the IA-Poll frame (Type: 2) from the master AP reset an NAV, conduct remaining BAR/BA exchanges, and transmit an IA-Poll frame (Type: 2) to a next AP on the list after the BAR/BA exchanges are finished. In this case, for protection, before transmitting the IA-Poll frame (Type: 2) after acquiring the channel, the master AP may conduct transmission of a plurality of RTSs/CTSs or mRTS/mCTS with APs not finishing the BAR/BA process.

The embodiments described herein may be implemented using hardware components, software components, and/or combinations of hardware components and software components. For instance, the units and components illustrated in the embodiments may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave in order to provide instructions or data to the processing device or to be interpreted by the processing device. The software may also be distributed over network coupled computer systems so that the software is stored and executed in a distributed fashion. The software and data may be stored by one or more non-transitory computer readable recording mediums.

The methods according to the embodiments may be realized as program instructions implemented by various computers and be recorded in non-transitory computer-readable media. The media may also include, alone or in combination with the program instructions, data files, data structures, and the like. The program instructions recorded in the media may be designed and configured specially for the embodiments or be known and available to those skilled in computer software. Examples of the non-transitory computer readable recording medium may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine codes, such as produced by a compiler, and higher level language codes that may be executed by the computer using an interpreter. The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents. Thus, other implementations, alternative embodiments and equivalents to the claimed subject matter are construed as being within the appended claims.

The invention claimed is:

1. An operation method of an access point (AP) comprising:
   determining at least one neighboring AP to perform interference alignment (IA) in cooperation with the AP;
   receiving first channel information between at least one station associated with the AP and the AP and second channel information between the at least one station and the at least one neighboring AP from the at least one station;
   acquiring IA information based on the first channel information and the second channel information; and
   transmitting data based on the IA information,
   wherein the transmitting comprises:
   transmitting an IA Synchronization (Synch) frame to the at least one neighboring AP; and
   transmitting downlink data simultaneously with the at least one neighboring AP during a transmission duration comprised in the IA Synch frame.

2. The operation method of claim 1, wherein the receiving comprises:
   transmitting an IA Null Data Packet (NDP) Announcement frame comprising an AP list and an station information (STA Info) list to the at least one neighboring AP and the at least one station;
   transmitting an NDP to the at least one station; and
   transmitting an AP-Poll frame of a predetermined type to a next neighboring AP on the AP list.

3. The operation method of claim 2, wherein a neighboring AP corresponding to an address of a Receiver Address (RA) field comprised in the AP-Poll frame of the predetermined type resets a Network Allocation Vector (NAV), transmits the IA NDP Announcement frame to stations associated with the neighboring AP, and transmits an NDP to the stations.

4. The operation method of claim 1, wherein the receiving comprises:
   transmitting an IA Beamforming (BF) Report Poll frame to the at least one station;

receiving a BF Report frame comprising the first channel information and the second channel information from the at least one station; and transmitting an AP-Poll frame of a predetermined type to a next neighboring AP on an AP list.

5. The operation method of claim 4, wherein the BF Report Poll frame comprises a Segment Retransmission Bitmap field for the AP and a Segment Retransmission Bitmap field for the at least one neighboring AP.

6. The operation method of claim 4, wherein a neighboring AP corresponding to an address of an RA field comprised in the AP-Poll frame of the predetermined type resets a Network Allocation Vector (NAV), transmits the IA BF Report Poll frame to stations associated with the neighboring AP, and receives a BF Report frame from the stations.

7. The operation method of claim 4, wherein the receiving further comprises:

determining a neighboring AP which needs to additionally receive a BF Report frame; and transmitting the AP-Poll frame of the predetermined type to the determined neighboring AP.

8. The operation method of claim 1, wherein the transmitting further comprises:

transmitting a multicast Request to Send (RTS) frame to the at least one neighboring AP; and receiving a multicast Clear to Send (CTS) frame from the at least one neighboring AP.

9. The operation method of claim 1, wherein a neighboring AP corresponding to an address of an AP Basic Service Set Identification (BSSID) field comprised in the IA Synch frame resets a Network Allocation Vector (NAV) and transmits downlink data after SIFS using IA.

10. The operation method of claim 1, wherein the transmitting further comprises transmitting a Block Acknowledgement (Ack) Request (BAR) frame to the at least one station;

receiving a Block Ack (BA) frame from the at least one station; and transmitting an AP-Poll frame of a predetermined type to a next neighboring AP based on order information on APs comprised in an IA Synchronization (Synch) frame.

11. The operation method of claim 10, wherein a neighboring AP corresponding to an address of a Receiver Address (RA) field comprised in the AP-Poll frame of the predetermined type resets a Network Allocation Vector (NAV), transmits the BAR frame to stations associated with the neighboring AP, and receives the BA frame from the stations.

12. The operation method of claim 1, wherein the transmitting further comprises:

receiving an AP-Poll frame of a predetermined type from the at least one neighboring AP;

determining neighboring APs which need to additionally transmit data based on a more data bit comprised in the AP-Poll frame of the predetermined type; and transmitting an IA Synch frame to the determined neighboring APs.

13. The operation method of claim 1, wherein the first channel information is channel information estimated from a Null Data Packet (NDP) received from the AP directly associated with the at least one station, and the second channel information is channel information estimated from an NDP received from the at least one neighboring AP which is not associated with the at least one station but belongs to the same IA transmission group.

14. An operation method of an access point (AP), comprising:

determining at least one neighboring AP to perform interference alignment (IA) in cooperation with the AP;

receiving first channel information between at least one station associated with the AP and the AP and second channel information between the at least one station and the at least one neighboring AP from the at least one station;

acquiring IA information based on the first channel information and the second channel information; and transmitting data based on the IA information, wherein the determining comprises:

transmitting an IA-Request to Send (RTS) frame comprising a candidate AP list to the at least one neighboring AP;

transmitting a Clear to Send (CTS)-Poll frame to a first neighboring AP comprised in the candidate AP list; and determining the first neighboring AP as an IA participant node when an IA-CTS frame is received from the first neighboring AP.

15. An operation method of an access point (AP), comprising:

determining at least one neighboring AP to perform interference alignment (IA) in cooperation with the AP;

receiving first channel information between at least one station associated with the AP and the AP and second channel information between the at least one station and the at least one neighboring AP from the at least one station;

acquiring IA information based on the first channel information and the second channel information; and transmitting data based on the IA information, wherein the acquiring comprises:

generating IA calculation information for the AP based on the first channel information and the second channel information;

transmitting the IA calculation information for the AP to the at least one neighboring AP; and receiving IA calculation information for the at least one neighboring AP from the at least one neighboring AP.

16. The operation method of claim 15, wherein when the IA calculation information for the at least one neighboring AP is received via a cable, expected data transmission duration for the at least one neighboring AP is further received.

* * * * *